Patented Nov. 18, 1952

2,618,609

UNITED STATES PATENT OFFICE 2,618,609

MANUFACTURE OF MIXTURE OF CARBOXY-METHYL CELLULOSE, SODIUM CHLORIDE, AND SODIUM CARBONATE

Charles H. Rigby, Saltcoats, and Callum A. Macinnes, Stornoway, Isle of Lewis, Scotland, assignors to Imperial Chemical Industries Limited, a corporation of Great Britain No Drawing. Application July 7, 1949, Serial No. 103,536. In Great Britain August 18, 1948

5 Claims. (Cl. 252—156)

The present invention relates to an improvement in the manufacture of water soluble salts of carboxyalkyl celluloses by the customary method of etherifying semi-moist soda cellulose with chlorinated fatty acids under alkaline conditions, and more particularly to an improvement in the manufacture of water soluble sodium salts of carboxymethyl cellulose, that is especially useful when the sodium salt of the carboxyalkyl cellulose is to be employed in a form still unseparated from the crystalline sodium salts formed in the reaction, which consist mainly of sodium chloride.

Water soluble sodium salts of carboxymethyl cellulose of various degrees of etherification are manufactured on a commercial scale and are employed as thickening agents and the like for a variety of purposes, for instance in compositions in which they are associated with detergent compounds. Since they differ from alkyl celluloses in being soluble in hot water as well as cold water they are difficult to isolate from the crystalline sodium salts that are formed along with them in the etherification reaction by means of which they are produced; but for certain of their applications the presence of the sodium salts thus formed is unobjectionable or even advantageous. Thus the activity of certain detergent compounds is increased by the presence of sodium chloride.

In carrying out the etherification reaction the amount of sodium hydroxide required to give a satisfactory product is always high enough to leave the mixture alkaline after the reaction is complete.

Once the starting materials have been well mixed together by mechanical agitation the etherification reaction may be allowed to take place with or without application of external heat. The transfer of the resulting mixture to temporary storage vessels from the mixing apparatus may be desirable according to the temperature at which the reaction is to proceed and hence the time it is to occupy. Since the continued presence of the residual sodium hydroxide in the product would render the sodium salt of the carboxyalkyl cellulose liable on exposure to air to serious diminution in its viscosity characteristics and development of the yellow colour as a result of oxidative degradation, it being the practice to neutralize the residual sodium hydroxide or to convert it into a salt of low alkalinity by incorporating a suitable neutralising or decausticising compound into the semi-moist reaction product after the reaction has been completed, in order to convert the free sodium hydroxide into a salt of non-alkaline or only weakly alkaline reaction. For instance when the product is to be used in association with detergents, sodium bicarbonate has been employed for this purpose.

Even if the reaction product is to contain the crystalline sodium salts resulting from the etherification reaction it has thus hitherto been necessary to defer its despatch until after the reaction has gone to completion and the sodium bicarbonate or other decausticising agent has been incorporated into the product with suitable mechanical action.

It is an object of the present invention to simplify the manufacture of water soluble sodium salts of carboxyalkyl celluloses, and in particular to render possible the production of a damp sodium salt of a carboxyalkyl cellulose containing the crystalline salts formed in the etherification, which will not undergo any serious diminution in its viscosity on exposure to air, by a process wherein the whole of the reagents required are incorporated before the etherification has proceeded to any substantial extent.

The process of the present invention depends on the unexpected discovery that the presence of added solid sodium bicarbonate in a semi-moist mixture containing soda-cellulose and a sodium salt of a chloro-fatty acid in proportions suitable in the absence of the bircarbonate for the satisfactory progress of the etherification reaction does not prevent the reaction from progressing satisfactorily, although by the time the etherification is complete it will transform the excess of sodium hydroxide unconsumable by etherification into sodium carbonate.

According to the present invention the process for the manufacture of a water-soluble sodium salt of a carboxyalkyl cellulose comprises incorporating into a damp mixture comprising cellulose, the sodium salt of a chloro-fatty acid, and sodium hydroxide in quantities that would normally leave an unconsumed excess on completion of the etherification at least sufficient sodium bicarbonate to convert the excess sodium hydroxide into sodium carbonate, said sodium bicarbonate being incorporated before the etherification reaction is allowed to proceed to any substantial extent.

The solid sodium bicarbonate may be mixed with the semi-moist mass containing the cellulose and sodium hydroxide either before or after the introduction of the chloro-fatty acid or sodium salt of the chloro-fatty acid, or, when the sodium salt of the chloro-fatty acid is used, mixed with the latter, but it must not be mixed wih the sodium hydroxide in the absence of the cellulose.

The etherification reaction proceeds at a considerably slower rate than when the sodium bicarbonate is omitted, but in the fully etherified reaction mixture the sodium salt of the carboxyalkyl cellulose obtained is of substantially the same degree of etherification.

After the ingredients have all been mixed together the material may be discharged from the mechanical mixer and the reaction may be allowed to proceed in the containers in which it is finally to be despatched, and these may even be despatched so soon that during a substantial part of the time required for the reaction to complete itself the material is actually being transported to the consumer instead of being in the hands of the manufacturer.

If, however, the sodium salt of the carboxyalkyl cellulose is to be purified, the products of a plurality of successive etherification batches of unpurified material may be purified all at one time after the youngest has been stored long enough to complete the etherification, without any detriment to the physical properties of the material of the older batches occurring during the differing periods for which they are thus stored.

The following examples in which the parts and percentages are by weight illustrate the practice of our invention.

*Example 1*

4.5 parts of coarsely disintegrated sulphite woodpulp sheet containing 10% of moisture and 82% of alpha cellulose are mixed in a Werner Pfleiderer incorporating machine with 4.5 parts of alcohol and 4.25 parts of 53% sodium hydroxide solution for a period of 1 hour at a temperature of 20–25° C. To the shredded mixture so obtained is added 1.81 parts of finely powdered mono-chloracetic acid followed by 1.5 parts of powdered sodium bicarbonate and mixing is continued for 30 minutes at a temperature of 20–25° C.

The resulting homogeneous mixture is then discharged into the containers in which it is to be despatched.

The course of the etherification is followed by the withdrawal of small samples at increasing intervals after discharge and determination of their degree of etherification. The progress of the etherification in a typical preparation carried out in accordance with this example is demonstrated by the figures given in column 2 of the following table, corresponding figures being given in column 3 for a preparation not in accordance with the invention but carried out in a manner identical save for the fact that there is no addition of sodium bicarbonate until the etherification has proceeded to completion.

| Time of Aging, Hours | Number of sodium carboxymethyl groups per glucose unit of cellulose | |
|---|---|---|
| | Sodium bicarbonate added before reaction | No sodium bicarbonate added until reaction completed |
| 0 | 0.06 | 0.09 |
| 1 | 0.09 | 0.11 |
| 2 | 0.12 | 0.14 |
| 3 | 0.14 | 0.16 |
| 4 | 0.20 | 0.27 |
| 5 | 0.20 | 0.29 |
| 6 | 0.25 | 0.42 |
| 7 | 0.27 | 0.47 |
| 24 | 0.39 | 0.52 |
| 48 | 0.42 | 0.51 |
| 144 | 0.48 | |
| 168 | 0.48 | |

It will be apparent that the rate of etherification in a reaction carried out according to our invention is somewhat retarded. Nevertheless the ultimate extent of the etherification is almost unaffected. After aging for 168 hours the product made in accordance with the example is completely soluble in hot and cold water giving 3% solutions of viscosity ranging from 40 to 70 centipoises. After a further 3 months' storage, it is still white and its viscosity characteristics are not appreciably diminished.

*Example 2*

4.5 parts of finely powdered woodpulp containing 8% of moisture and 84% of alpha cellulose, sold under the registered trade-mark "Solka Floc" are mixed in a Werner Pfleiderer incorporating machine with 7.25 parts of a 27.5% aqueous sodium hydroxide solution for a period of 1 hour at a temperature of 20–25° C. To the homogeneous mixture so obtained are added 1.41 parts of powdered sodium bicarbonate followed by 3.88 parts of a finely powdered mixture of sodium chloracetate and sodium carbonate. The latter mixture is prepared by kneading 2.80 parts of monochloracetic acid with 1.76 parts of anhydrous sodium carbonate at a temperature below 25° C., until the reaction is complete. The cellulose etherification mixture is mixed in a Werner Pfleiderer incorporator for 30 minutes at a temperature of 20–25° C. to ensure uniform distribution of the ingredients. The homogeneous mixture so obtained is discharged into the containers in which it is to be despatched.

The course of the etherification in a preparation carried out according to this example and also in a preparation not in accordance with our invention in which the reaction is allowed to proceed to completion before treatment with sodium bicarbonate but otherwise identical is illustrated by the figures in columns 2 and 3 respectively in the following table:

| Time of Aging, Hours | Number of sodium carboxymethyl groups per glucose unit of cellulose | |
|---|---|---|
| | Sodium bicarbonate added before reaction | No sodium bicarbonate added until reaction completed |
| 0 | 0.08 | 0.07 |
| 1 | 0.13 | 0.11 |
| 2 | 0.19 | 0.21 |
| 4 | 0.35 | 0.52 |
| 5 | 0.41 | 0.59 |
| 6 | 0.43 | 0.65 |
| 7 | 0.43 | 0.64 |
| 24 | 0.62 | 0.67 |
| 48 | 0.65 | 0.65 |
| 72 | 0.65 | |

As in Example 1 the rate of etherification in the reaction carried out according to our invention is somewhat retarded but the ultimate extent of substitution is the same and is obtained after 48 hours storage. The viscosity and solubility characteristics of the aged product resemble those of the aged product of Example 1.

*Example 3*

4.5 parts of finely powdered woodpulp as used in Example 2 are mixed in a Werner Pfleiderer incorporating machine with 4.5 parts of 95% alcohol and 4.25 parts of a 53% solution of sodium hydroxide for a period of 1 hour at a temperature of 20–25° C.

With the moist homogeneous mixture so obtained are intimately mixed for a period of 30 minutes at a temperature of 20-25° C., 1.81 parts of finely powdered mono-chloracetic acid followed by 2.0 parts of sodium bicarbonate, which represent an excess of 33% over that which is theoretically required to convert the excess sodium hydroxide to sodium carbonate.

The homogeneous moist powder is then discharged into the containers in which it is to be transported to the consumers.

The progress of the etherification is followed by periodic determinations of the degree of substitution and compared, in the table below, with an example not in accordance with our invention in which the excess sodium hydroxide is not treated with sodium bicarbonate until after the completion of the etherification.

It is seen that notwithstanding the presence of an excess of sodium bircarbonate over that which is theoretically required to convert to sodium carbonate the sodium hydroxide not consumed in the etherification, the etherification reaction still proceeds to the same ultimate extent as in the case in which no sodium bicarbonate is added before completion of the etherification.

| Time of Aging, Hours | Number of sodium carboxymethyl groups per glucose unit of cellulose | |
| --- | --- | --- |
| | Sodium bicarbonate added before reaction | No sodium bicarbonate added until reaction completed |
| 0 | 0.10 | 0.10 |
| 3 | | 0.41 |
| 24 | | 0.51 |
| 48 | 0.43 | 0.51 |
| 168 | 0.50 | |

The product aged for 168 hours is very similar in properties to the similarly aged product of Example 1.

We claim:

1. A process for the manufacture of a mixture of sodium carboxymethyl cellulose, sodium chloride and sodium carbonate which comprises, forming a damp reaction mixture of cellulose, sodium hydroxide, sodium bicarbonate, and a compound from the group consisting of chloracetic acid and sodium salts thereof, said sodium hydroxide being present in excess of the amount required for the etherification of the cellulose with the chloracetic acid so as to leave an unconsumed excess of the sodium hydroxide on completion of the said etherification reaction, said sodium bicarbonate being present in an amount at least sufficient to convert the said excess sodium hydroxide into sodium carbonate, said sodium bicarbonate being incorporated in the reaction mixture before the etherification reaction has proceeded to any substantial extent.

2. A process as claimed in claim 1 wherein the said reaction mixture is produced by mixing the sodium bicarbonate with a damp mass containing the cellulose and sodium hydroxide and thereafter admixing a compound selected from the group consisting of chloracetic acids and the sodium salts thereof.

3. A process as claimed in claim 1 wherein the said reaction mixture is produced by mixing the sodium bicarbonate with the sodium salt of a chloracetic acid and thereafter admixing a damp mass containing cellulose and sodium hydroxide.

4. A process as claimed in claim 1 in which the sodium bicarbonate is present in excess of that amount theoretically required to convert the excess sodium hydroxide to sodium carbonate.

5. A process as claimed in claim 1 wherein the ultimate extent of etherification is unaffected by the incorporation of the sodium bicarbonate before the etherification reaction is allowed to proceed to any substantial extent.

CHARLES H. RIGBY.
CALLUM A. MACINNES.

REFERENCES CITED

The following references are of record in the file of this patent:

UNITED STATES PATENTS

| Number | Name | Date |
| --- | --- | --- |
| 1,682,294 | Lilienfeld | Aug. 28, 1928 |
| 2,179,457 | Voss | Nov. 7, 1939 |
| 2,190,445 | Ellsworth | Feb. 13, 1940 |
| 2,236,545 | Maxwell et al. | Apr. 1, 1941 |